United States Patent [19]

Hattenbach et al.

[11] Patent Number: 5,184,415
[45] Date of Patent: Feb. 9, 1993

[54] UNIDIRECTIONAL TRAVEL REGULATOR FOR RODENTS AND OTHER SMALL ANIMALS

[76] Inventors: Timothy Hattenbach, 1015 Harvard, Houston, Tex. 77008; Matthew Hahn, 2404 North Blvd., Houston, Tex. 77098

[21] Appl. No.: 865,877

[22] Filed: Apr. 9, 1992

[51] Int. Cl.⁵ .............................................. A01M 1/10
[52] U.S. Cl. .................................... 43/58; 114/221 R
[58] Field of Search .................. 43/58, 65; 114/221 R

[56] References Cited

U.S. PATENT DOCUMENTS

| | | | |
|---|---|---|---|
| 1,060,993 | 5/1913 | Maynard | 114/221 R |
| 1,074,998 | 10/1913 | Young | 43/58 |
| 1,164,483 | 12/1915 | Duplantis | 43/58 |
| 1,282,423 | 10/1918 | Honan | 43/58 |
| 2,488,466 | 11/1949 | Carver | 43/65 |
| 4,782,622 | 11/1988 | Roberts | 43/131 |

Primary Examiner—Kurt C. Rowan
Attorney, Agent, or Firm—Bernard A. Reiter; Umesh M. Desai

[57] ABSTRACT

A rodent barrier means, made of non-conductive material, attached to an electrical cable, hawser, or the like providing for egress in a certain direction but preventing ingress from that direction. A rodent barrier means having alternative means of exit in the form of a ladder and a tapering passageway. A rodent barrier of unitary construction having a top half and a bottom half and which halves are clamped onto said electrical cable, hawser, and the like. The tapering passageway further having a safety measure in the form of a spring loaded screen door allowing for egress through said passageway but preventing ingress. The bottom half of the rodent barrier means having either weight means or otherwise being bottom heavy to thereby further provide stability in severe weather conditions.

6 Claims, 2 Drawing Sheets

UNIDIRECTIONAL TRAVEL REGULATOR FOR RODENTS AND OTHER SMALL ANIMALS

BACKGROUND OF THE INVENTION

1. Field of Invention

The present invention is a barrier means to be attached to electrical cables, hawsers and the like lines for preventing rodents and other small animals from passage thereover and for thus preventing entry into buildings, ships, and boats. The invention constitutes a passageway that permits exit but not entry.

2. Related Prior Art

Rat guards or rodent barrier means have been used around ship hawsers for many years now. Such guards prevent rats, other rodents, and animals on the shore from boarding the ship by simply walking along the hawsers and entering the ship. Heretofore, such guards generally comprised large circular disks split into two hinged halves and clamped in some fashion on the ship hawsers. Despite these precautions, the rodents and animals have often been able to jump over the guards and board the ship without paying any fare.

Entry into buildings through electrical cables has also been a common occurrence for many decades. However, no known solution has been available for preventing these disadvantageous, if not damaging, trespasses.

The features of many of the rat guard inventions has consisted solely of a single circular disk attached to the line. An example of such a device would be a teaching by Salvarezza (U.S. Pat. No. 3,872,818) which discloses a rat guard for ship hawsers. The rat guard is a polygonal barrier plate having a generally flat bottom portion and a top portion with two steep converging edges meeting at a narrow vertex at the very top. The bottom portion is connected to these top converging edges by two upwardly diverging sides one of which has a slot that extends at an angle to the center of the guard. A door is provided to move into the slot and closing around the hawser once the guard is inserted upon the hawser.

Another example of a teaching of a rat guard is by Bush (U.S. Pat. No. 2,459,060) disclosing a guard having a circular plate with a slot and a closing door.

Another example of a teaching of a rat guard is by Bernhard (U.S. Pat. No. 2,483,874) which discloses a circular plate made of two halves with a closable slot.

Yet another teaching of a rat guard is one my Mucke (U.S. Pat. No. 2,525,234) disclosing a substantially frusto-conical shield with a slot to insert the hawser therethrough.

Yet another example of a rat guard is taught by Carver (U.S. Pat. No. 2,488,466) disclosing a circular plate with a hole near the center. On the back side of the circular plate discloses a cage to catch the rat leaving the ship. The cage allows for entry of the rat but prevents exit.

Yet another example of a rat guard is taught by Roberts (U.S. Pat. No. 4,782,622) which discloses a rat guard having a tubular body cut in half to be mounted on a hawser and which allows for entry of the rodent into said tubular body. The tubular body further has provision for storing toxic chemical compounds active to repel or destroy rodent or insect vermin.

SUMMARY OF THE INVENTION

It is an object of this invention to provide a new and improved rodent barrier that may be used in a number of different circumstances. For example, it may be used in conjunction with a building, or in the alternative, in conjunction with a ship or boat, or any such like use where a barrier means preventing rodent travel is needed.

It is a further object of the present invention to provide a rodent barrier that is manufactured from non-conducting material so that any utility cables will not be short-circuited.

It is a further object of this invention to provide a rodent barrier which allows for egress from one direction but which also prevents ingress in that direction.

It is still a further object of this invention to provide a new and improved rodent barrier disclosing various methods of egress. For example, the barrier means will allow for exit through a tunnel, or in the alternative, exit through a ladder.

It is further an object of this invention to provide a unitary, light yet stable body preventing rodent access in a given direction.

It is yet a further object of this invention to provide a rodent barrier that can be easily mounted onto an electrical cable, a hawser, or the like.

It is yet a further object of this invention to provide a new and improved rodent barrier that may be manufactured inexpensively and which is easy to install.

In accordance with the above objects, the rodent barrier comprises a unitary non-conductive body made of two halves which are attached to the electrical cable, hawser, or other line running therethrough. The top half of the unitary body having various egress means while providing a barrier means for rodent ingress. The bottom half of the unitary body also provides a barrier means for rodent ingress. Further, the bottom half functions to provide a stabilizing body for the barrier, and which is especially needed in severe weather conditions. The rodent barrier comprises a means which allows travel in one direction. The travel may occur in the intended direction in two alternative ways. A first path means provides for the rodent to exit through a tapering tunnel and yet which prevents reentry. The tunnel is also characterized by biased screen door which provides a safety measure in cases where a small rodent enters the tunnel from the tapered (exit) side. A second alternative path means provides for a ladder means allowing the rodent to climb over and to thereby jump on the other side of the barrier, and yet which also prevents reentry.

The foregoing and other objects, features and advantages of the invention will be apparent from the following more particular description of a preferred embodiment, as well as an alternative embodiment of the invention as illustrated in the accompanying drawings.

DETAILED DESCRIPTION OF THE PRESENT INVENTION

Figure 1:
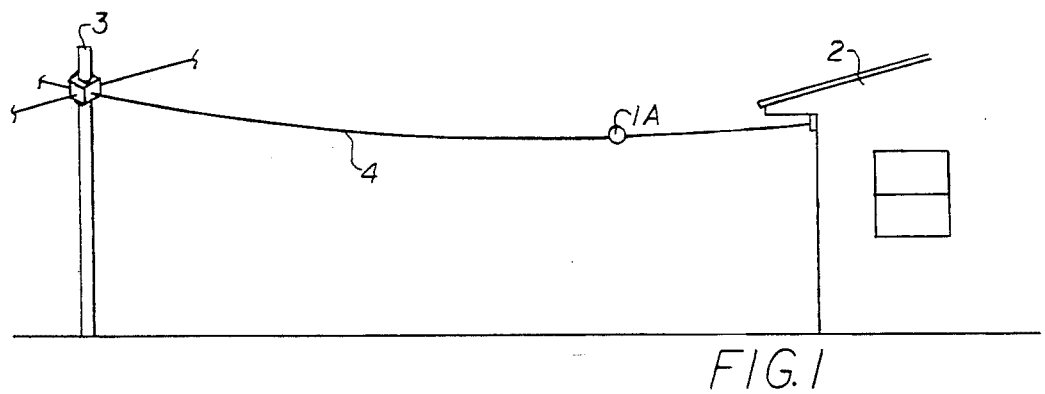
FIG. 1 represents a perspective view of the rodent barrier installed for exemplary purposes on an electrical cable connected to a building.

Referring now to the drawings of the present invention, the preferred and alternate embodiments will be described with more particularity.

Referring now to FIG. 1 of the drawings, a unidirectional barrier means 1A for rodents and other small animals is shown according to the intended use as it relates to an electrical cable 4 coming to a building 2 made of non-conductive material. Similarly, the unidirectional barrier means 1A may also be attached to a hawser between a ship or boat and the dock. The barrier means 1A may further be used in a similar fashion in other applicable situations.

Figure 2:
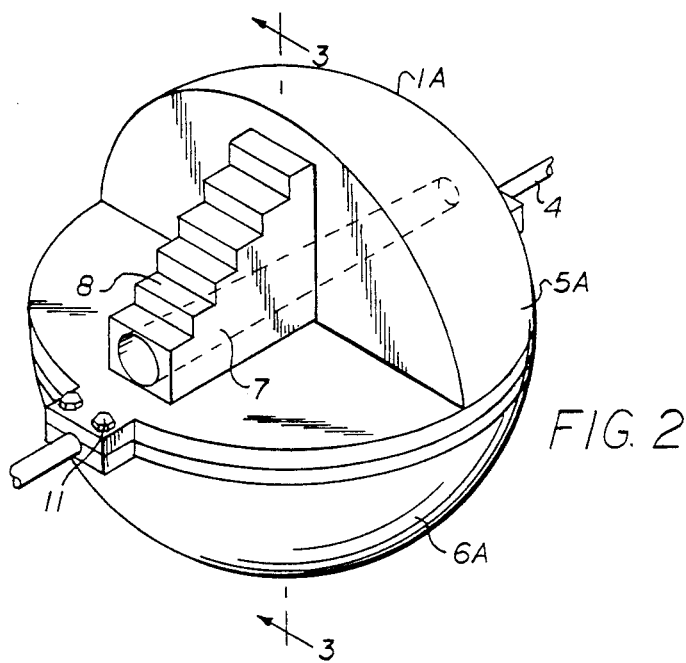
FIG. 2 is a perspective showing the new and improved rodent barrier in the preferred embodiment.
Figure 3:
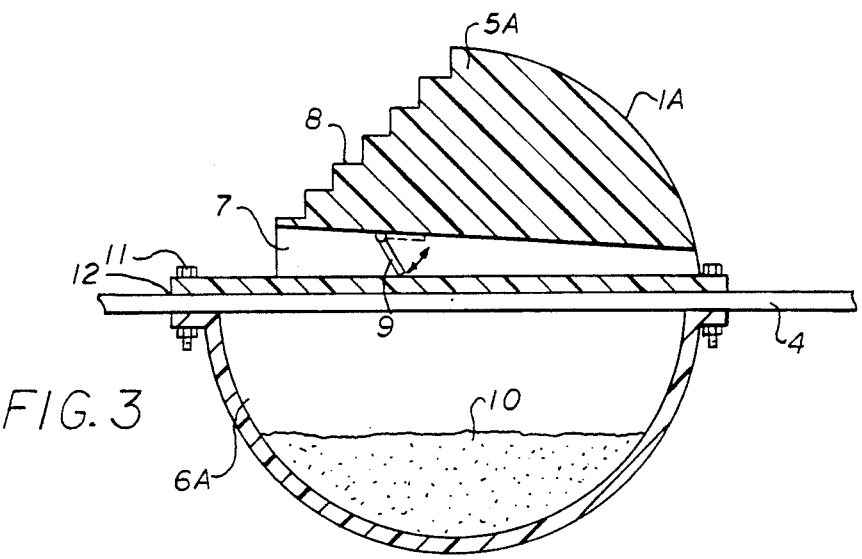
FIG. 3 discloses a side view of the rodent barrier in the preferred embodiment.

The preferred embodiment of the barrier means 1A, made of nonconductive material, is disclosed in FIG. 2. FIG. 2 discloses a generally cylindrical body having an upper section 5A and a lower section 6A dividing the barrier means 1A in half. Upon installation, the upper section 5A and the lower section 6A are converged and clamped onto electrical cable 4, the hawser, and the like. The upper and lower sections, 5A and 6A, respectively, are attached together with a nut-and-bolt combination 11 suitably adjusted to remain firmly attached to the electrical cable 4, the hawser and the like. In FIG. 3 a cross-sectional view is disclosed and which reveals that the electrical cable 4, the hawser, and the like passes through the barrier means 1A through a central passageway 12 formed when the upper section 5A and the lower section 6A are brought together.

The upper section 5A reveals means 7 and 8, respectively, whereby the rodent and other small similar animals may pass through. Alternate means 7 and 8, respectively, are provided for rodents and other similar animals to travel in a given direction. For example, if one were attempting to get rid of rodents from a building 2, then the owner would install the barrier means 1A such that travel from the building 2 may occur but not vice versa. The upper section 5A discloses a unidirectional passageway 7 through which a rodent may crawl to escape the building 2. The unidirectional passageway 7 is tapered so that once the rodent passes through it. It may not return in the same direction. Also provided within the unidirectional passageway 7 is an optional spring loaded screen door 9. This optional screen door 9 further provides a safety measure should a small rodent manage to enter the unidirectional passageway 7. The optional screen door 9 thus provides a barrier 1A means preventing the rodent from traveling in the direction of the building 2, a boat or the like.

An alternative means to escape the building 2, the boat, and the like, is provided by a ladder 8. The ladder 8 simply provides the rodent a staircase upon which it can travel to get to the other side. However, once it gets to the other side, it may not return because of the curved shape of the barrier means 1A. Thus, a rodent attempting to enter a building 2, a boat, and the like will be faced with, in the preferred embodiment, a spherical barrier means 1A which will prevent it from entering the building 2, ship and the like.

The lower section 6A of the barrier means 1A has at least two functions. The first, of course, is that it acts as the barrier. Secondly, the space within is used to hold weight means 10 to stabilize and balance the barrier means 1A as a whole. Once the upper and lower sections, 5A and 6A, respectively, are clamped together the barrier means 1A may wobble and shake in adverse weather conditions. However, because weight means 10, such as sand or dirt or any such other means, is provided within the cavity of the lower section 6A, the barrier means 1A becomes stable such that severe weather conditions will have little impact on the barrier means 1A. Alternatively, the lower section 6A, itself may be constructed from heavy material such that the lower section 6A provides stability.

Figure 4:
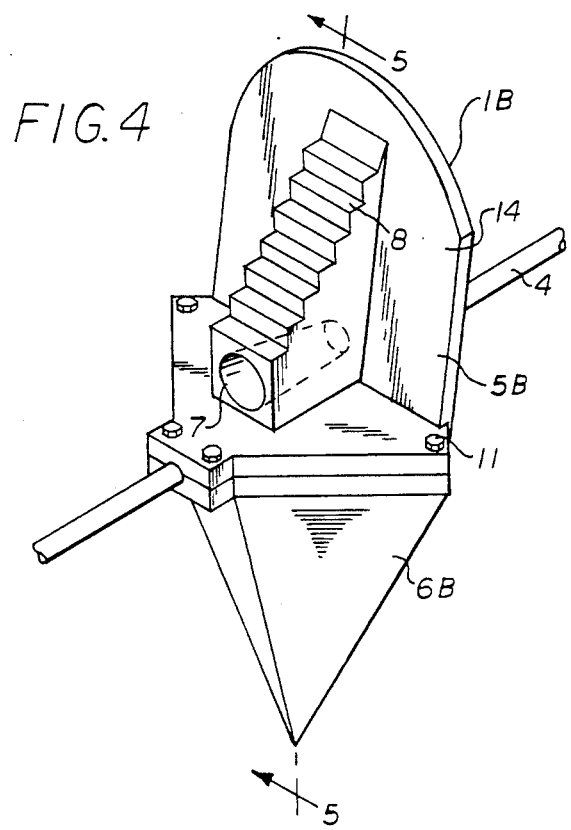
FIG. 4 represents perspective view of the rodent barrier in the alternative embodiment.
Figure 5:
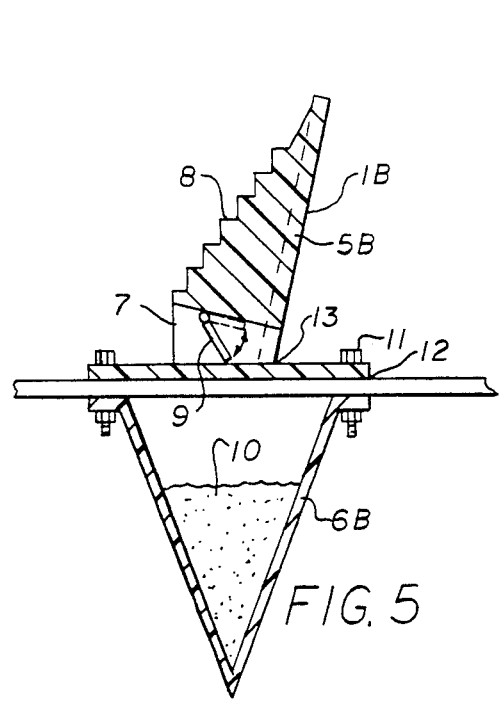
FIG. 5 represents a side view of the rodent barrier in the alternative embodiment of FIG. 4.
Figure 6:
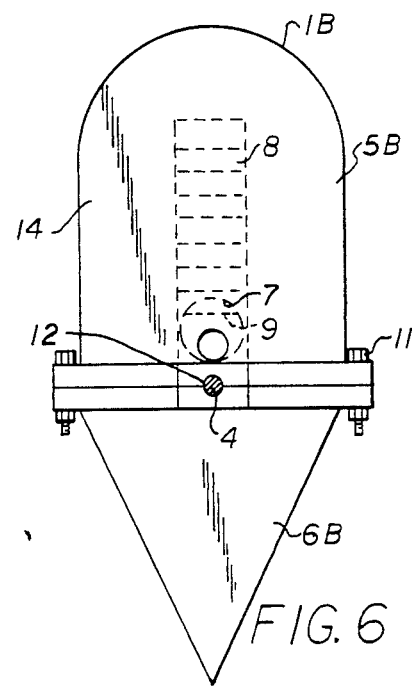
FIG. 6 represents a front view of the rodent barrier in the alternative embodiment of FIG. 4.

An alternate embodiment 1B, also made of non-conductive material, is disclosed in FIGS. 4, 5 and 6. An alternate embodiment 1B uses virtually the same principles described above. The only difference between the preferred and the alternate embodiment, 1A and 1B, respectively, is the shape of the upper and lower sections 5A, 5B and 6A, 6B, respectively. In the alternate embodiment, as shown in FIG. 4, the upper section 5B discloses a very sharp angled barrier wall 14 as a barrier means 1A. The acute angle 13 between the travelling path and the barrier wall 14 makes it virtually impossible that a rodent will ever cross the barrier means. The alternate embodiment 1B also discloses a unidirectional passageway 7 and a ladder 8 for rodent travel. The unidirectional passageway 7 in the alternate embodiment 1B is also provided with an optional spring loaded screen door 9. The lower section 6B of the alternate embodiment 1B has a generally pyramidical shape again providing for stability and balance when loaded with sand or other weight means 10. The lower section 6B may also be made of heavy material to provide stability. In the alternate embodiment 1B, however, the pyramidical shape creates a center of gravity through the central plane of the barrier means 1B and, thereby, virtually assuring the user that the rodent barrier means will remain stable in adverse weather conditions.

Thus, it is apparent that there has been provided, in accordance with the invention, a rodent barrier means 1A and 1B which provides a utilitarian barrier preventing rodents from traveling in a given direction which may be installed with ease and convenience. While the invention has been described in conjunction with specific embodiments thereof, it is evident that many alternatives, modifications, and variations would be apparent to those skilled in the art in light of the foregoing description. Accordingly, this invention is intended to embrace all such alternatives, modifications, and variations as fall within the spirit and scope of the appended claims. For example, the shape of the upper section 5A, 5B and lower section 5A, 5B may be varied to be more aerodynamic, or as such, as to provide the use of the rodent barrier means 1A, 1B at different angles. Another modification would be the implementation of means to attract rodents away from a building, ship, or boat, and the like, such that a rodent would pass through the barrier but could not return. These modifications, additions, and/or alternatives are intended to be embraced within the present invention.

What is claimed is:

1. A unidirectional travel barrier for rodents and other similar animals to be located on lines such as electrical cables and hawsers comprising a body to be attached to an elevated utility line consisting of an upper section and a lower section;

said body providing a barrier means for preventing travel thereacross by a rodent or other pest-like creature;

said body having a unidirectional passageway encouraging said rodent or pest-like creature to travel therethrough in a first direction but preventing travel therethrough in the opposite direction; and said body further having a ladder means enabling exit by said rodent or pest-like creature in a said first direction but preventing travel in said opposite direction.

2. A unidirectional travel barrier made according to claim 1, wherein:

said body being divided in half sections for the purpose of attaching said body onto said utility line by clamping said half sections;

said body having a central passageway to run said utility line through said central passageway upon attachment; and said body having clamping means to securely clamp said half sections to said utility line.

3. A unidirectional travel barrier made according to claim 1, wherein:

said unidirectional passageway consists of a tapering passageway allowing egress by said rodents and other similar animals in a given direction, yet preventing ingress from that directions; and said unidirectional passageway located in said upper section and aligned with said utility line so as to encourage said rodent or pest-like creature to travel therethrough.

4. A unidirectional travel barrier made according to claim 3, wherein:

said unidirectional passageway further having a spring loaded screen door as a safety measure preventing travel by said rodents and other similar animals.

5. A unidirectional travel barrier made according to claim 1, wherein:

said lower section having weight means to provide stability and balance to said body especially in windy and like adverse conditions when said electrical cable, hawser, and the like may be vibrating, shaking and bouncing.

6. A unidirectional travel barrier made according to claim 1, wherein:

said body is made of non-conducting material so as to prevent electrical line short-circuit.

* * * * *